(12) United States Patent
Zhu et al.

(10) Patent No.: US 11,536,868 B2
(45) Date of Patent: Dec. 27, 2022

(54) METHOD FOR GENERATING PREDICTED ULTRASONIC MEASUREMENTS FROM SONIC DATA

(71) Applicant: SCHLUMBERGER TECHNOLOGY CORPORATION, Sugar Land, TX (US)

(72) Inventors: Lingchen Zhu, Medford, MA (US); Sandip Bose, Brookline, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/972,651

(22) PCT Filed: Jun. 7, 2019

(86) PCT No.: PCT/US2019/035975
§ 371 (c)(1),
(2) Date: Dec. 7, 2020

(87) PCT Pub. No.: WO2019/236955
PCT Pub. Date: Dec. 12, 2019

(65) Prior Publication Data
US 2021/0247537 A1 Aug. 12, 2021

Related U.S. Application Data

(60) Provisional application No. 62/682,327, filed on Jun. 8, 2018.

(51) Int. Cl.
*G01V 1/48* (2006.01)
*E21B 47/005* (2012.01)

(52) U.S. Cl.
CPC .............. *G01V 1/48* (2013.01); *E21B 47/005* (2020.05); *E21B 2200/20* (2020.05)

(58) Field of Classification Search
CPC ..... E21B 2200/20; E21B 47/005; G01V 1/48; G01V 1/50
See application file for complete search history.

(56) References Cited

U.S. PATENT DOCUMENTS

| 953,447 A | 3/1910 | Stickney |
|---|---|---|
| 9,534,487 B2 | 1/2017 | Zeroug et al. |

(Continued)

FOREIGN PATENT DOCUMENTS

| CN | 104265277 A | 1/2015 |
|---|---|---|
| CN | 205036370 U | 2/2016 |

(Continued)

OTHER PUBLICATIONS

Morris et al., "Application of Enhanced Ultrasonic Measurements for Cement and Casing Evaluation", SPE/IADC Drilling Conference held in Amsterdam, The Netherlands, Feb. 20-22, 2007. (Year: 2007).*

(Continued)

*Primary Examiner* — Regis J Betsch

(57) ABSTRACT

A method, computer program product, and computing system are provided for receiving sonic data associated with an inner casing of a well. Predicted ultrasonic data associated with an outer casing of the well may be generated based upon, at least in part, a nonlinear regression model and the received sonic data associated with the inner casing of the well.

12 Claims, 10 Drawing Sheets

(56) References Cited

U.S. PATENT DOCUMENTS

| | | |
|---|---|---|
| 10,138,727 B2 | 11/2018 | Zeroug et al. |
| 10,705,056 B2 | 7/2020 | Lei et al. |
| 2006/0133205 A1 | 6/2006 | Van Kuijk et al. |
| 2014/0052376 A1 | 2/2014 | Guo et al. |
| 2015/0168581 A1 | 6/2015 | Izuhara et al. |
| 2016/0265340 A1* | 9/2016 | Frisch ............. E21B 33/14 |
| 2017/0139072 A1 | 5/2017 | Kalyanraman |

FOREIGN PATENT DOCUMENTS

| | | | |
|---|---|---|---|
| GB | 2494780 B * | 11/2015 | ............. E21B 47/09 |
| WO | 2015116488 A1 | 8/2015 | |
| WO | 2016187242 A1 | 11/2016 | |

OTHER PUBLICATIONS

Braga, A. M. B. et al., "Well Integrity Monitoring: Challenges and Perspectives", OTC 24515 presented at the Offshore Technology Conference, Rio de Janeiro, 2013, 6 pages.

Jocker, J. et al. 2013 "Seismic Anisotropy Characterization in Heterogeneous Formations Using Borehole Sonic Data", SPE 166463 presented at The SPE Annual Technical Conference, New Orleans, Louisiana, U.S.A., 2013, 11 pages.

Al-Kindi, Z. L. et al. "Increased Certainty in the Determination of Zonal Isolation Through the Integration of Annulus Geometry Imaging and Improved Solid-Fluid Discrimination," SPE 120061 in SPE Middle East Oil and Gas Show and Conference, Manama, Bahrain, 2009, 9 pages.

International Search Report and Written Opinion of International Patent Application No. PCT/US2019/035975 dated Sep. 25, 2019, 10 pages.

International Preliminary Report on Patentability of International Patent Application No. PCT/US2019/035975 dated Dec. 17, 2020, 7 pages.

First Chinese Office Action issue in China Patent Application 201900472107 dated Aug. 22, 2022, 15 pages.

Examination Report issued in GB application GB2019272.0 dated Feb. 17, 2022 (5 pages).

* cited by examiner

10

200 — receiving, using one or more processors, sonic data associated with an inner casing of a well

204 — generating the nonlinear regression model using one or more neural networks

202 — generating predicted ultrasonic data associated with an outer casing of the well based upon, at least in part, a nonlinear regression model and the received sonic data associated with the inner casing of the well

206 — receiving measured ultrasonic data associated with the outer casing of the well at a plurality of well depths

208 — identifying corresponding sonic data at the plurality of well depths from the received sonic data associated with the inner casing of the well, thus defining a plurality of sonic data and ultrasonic data pairs defined for the plurality of well depths

210 — training the one or more neural networks with the plurality of sonic data and ultrasonic data pairs defined for the plurality of well depths

212 — estimating an inner casing standoff from the outer casing of the well based upon, at least in part, the measured ultrasonic data

214 — calibrating the trained one or more neural networks for generating predicted ultrasonic data on one or more of a different well and a different well depth, via transfer learning

FIG. 2

METHOD FOR GENERATING PREDICTED ULTRASONIC MEASUREMENTS FROM SONIC DATA

CROSS-REFERENCE TO RELATED APPLICATION

This application claims the benefit of U.S. Provisional Application No. 62/682,327, filed on Jun. 8, 2018; the contents of which are incorporated herein by reference.

FIELD

This application relates to predicting ultrasonic measurements and more particularly to generating predicted ultrasonic data associated with a well from sonic data associated with the well.

BACKGROUND

The evaluation of well integrity may help contain and/or prevent the escape of fluids to subterranean formations or a surface by using cementing and well logging data. Evaluating well integrity has become an essential task throughout the life of a well. Acoustic measurements from sonic scanners and ultrasonic scanners may be used to characterize the placing, mechanical, and bonding conditions of cement. Recently, there have been increasing interests in diagnosing the cement properties behind more than one pipeline string in the well borehole in some emerging markets, such as plug and abandonment.

Ultrasonic tools generally use ultrasonic techniques to evaluate the conditions of cementing and casing by transmitting an ultrasonic wave (e.g., with a frequency higher than 200 kHz) and combining the classical pulse-echo technique with flexural wave propagation to calculate the wave's attenuation between two receivers. By measuring azimuthally at the back of the casing, an ultrasonic tool may generally confirm zonal isolation, pinpoints cement channels if any, and may ensure confident bonding conditions. However, ultrasonic tools cannot diagnose the zonal isolation beyond the first casing and/or the annulus behind it in multiple casing string geometries because the transmitted ultrasonic energy does not penetrate beyond the second casing. One has to remove the inner string beforehand to evaluate the zonal isolation conditions of the outer string, which can be expensive and laborious.

SUMMARY

In some embodiments, a method (e.g., a computer-implemented method) is executed on a computing device and may include but is not limited to receiving sonic data associated with an inner casing of a well. Predicted ultrasonic data associated with an outer casing of the well may be generated based upon, at least in part, a nonlinear regression model and the received sonic data associated with the inner casing of the well.

One or more of the following example features may be included. The nonlinear regression model may be generated using one or more neural networks. Generating the nonlinear regression model using the one or more neural networks may include receiving measured ultrasonic data associated with the outer casing of the well at a plurality of well depths. Generating the nonlinear regression model using the one or more neural networks may include identifying corresponding sonic data at the plurality of well depths from the received sonic data associated with the inner casing of the well, thus defining a plurality of sonic data and ultrasonic data pairs defined for the plurality of well depths. Generating the nonlinear regression model using the one or more neural networks may include training the one or more neural networks with the plurality of sonic data and ultrasonic data pairs defined for the plurality of well depths. Generating the nonlinear regression model using the one or more neural networks may include calibrating the trained one or more neural networks for generating predicted ultrasonic data on one or more of a different well and a different well depth, with or without using the transfer learning technique. An inner casing standoff may be estimated from the outer casing of the well based upon, at least in part, the measured ultrasonic data. The one or more neural networks may include at least one of one or more convolutional neural networks and one or more fully-connected neural networks, with or without using the Bayesian neural networks. The received sonic data may include a plurality of sonic waveforms generated via a sonic scanning tool. The predicted ultrasonic data may include a plurality of ultrasonic measurements, including but not limited to ultrasonic flexural attenuation (UFAK), acoustic impedance (AIBK), cement bond logging (CBL), and other possible measurements that can be obtained from the ultrasonic and high frequency sonic cement evaluation tools.

In another example implementation, a computing system may include one or more processors and one or more memories, wherein the computing system is configured to perform operations that may include but are not limited to receiving sonic data associated with an inner casing of a well. Predicted ultrasonic data associated with an outer casing of the well may be generated based upon, at least in part, a nonlinear regression model and the received sonic data associated with the inner casing of the well.

One or more of the following example features may be included. The nonlinear regression model may be generated using one or more neural networks. Generating the nonlinear regression model using the one or more neural networks may include receiving measured ultrasonic data associated with the outer casing of the well at a plurality of well depths. Generating the nonlinear regression model using the one or more neural networks may include identifying corresponding sonic data at the plurality of well depths from the received sonic data associated with the inner casing of the well, thus defining a plurality of sonic data and ultrasonic data pairs defined for the plurality of well depths. Generating the nonlinear regression model using the one or more neural networks may include training the one or more neural networks with the plurality of sonic data and ultrasonic data pairs defined for the plurality of well depths. Generating the nonlinear regression model using the one or more neural networks may include calibrating the trained one or more neural networks for generating predicted ultrasonic data on one or more of a different well and a different well depth, via transfer learning. An inner casing standoff may be estimated from the outer casing of the well based upon, at least in part, the measured ultrasonic data. The one or more neural networks may include at least one of one or more convolutional neural networks and one or more fully-connected neural networks, with or without using the Bayesian neural networks. The received sonic data may include a plurality of sonic waveforms generated via a sonic scanning tool. The predicted ultrasonic data may include a plurality of ultrasonic measurements, including but not limited to ultrasonic flexural attenuation (UFAK), acoustic impedance (AIBK), cement bond logging (CBL), and other possible measurements that can be obtained from ultrasonic and high frequency sonic cement evaluation tools.

In yet another example implementation, a computer program product may include a non-transitory computer readable storage medium having a plurality of instructions stored thereon, which, when executed by a processor, cause the processor to perform operations including, but not limited to, receiving sonic data associated with an inner casing of a well. Predicted ultrasonic data associated with an outer casing of the well may be generated based upon, at least in part, a nonlinear regression model and the received sonic data associated with the inner casing of the well.

One or more of the following example features may be included. The nonlinear regression model may be generated using one or more neural networks. Generating the nonlinear regression model using the one or more neural networks may include receiving measured ultrasonic data associated with the outer casing of the well at a plurality of well depths. Generating the nonlinear regression model using the one or more neural networks may include identifying corresponding sonic data at the plurality of well depths from the received sonic data associated with the inner casing of the well, thus defining a plurality of sonic data and ultrasonic data pairs defined for the plurality of well depths. Generating the nonlinear regression model using the one or more neural networks may include training the one or more neural networks with the plurality of sonic data and ultrasonic data pairs defined for the plurality of well depths. Generating the nonlinear regression model using the one or more neural networks may include calibrating the trained one or more neural networks for generating predicted ultrasonic data on one or more of a different well and a different well depth, via transfer learning. An inner casing standoff may be estimated from the outer casing of the well based upon, at least in part, the measured ultrasonic data. The one or more neural networks may include at least one of one or more convolutional neural networks and one or more fully-connected neural networks, with or without using the Bayesian neural networks. The received sonic data may include a plurality of sonic waveforms generated via a sonic scanning tool. The predicted ultrasonic data may include a plurality of ultrasonic measurements, including but not limited to flexural attenuation (UFAK), acoustic impedance (AIBK), CBL and other possible measurements that can be obtained from the ultrasonic and high frequency sonic cement evaluation tools.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2 illustrates a flowchart showing operations consistent with embodiments of the present disclosure;

DETAILED DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Figure 1:
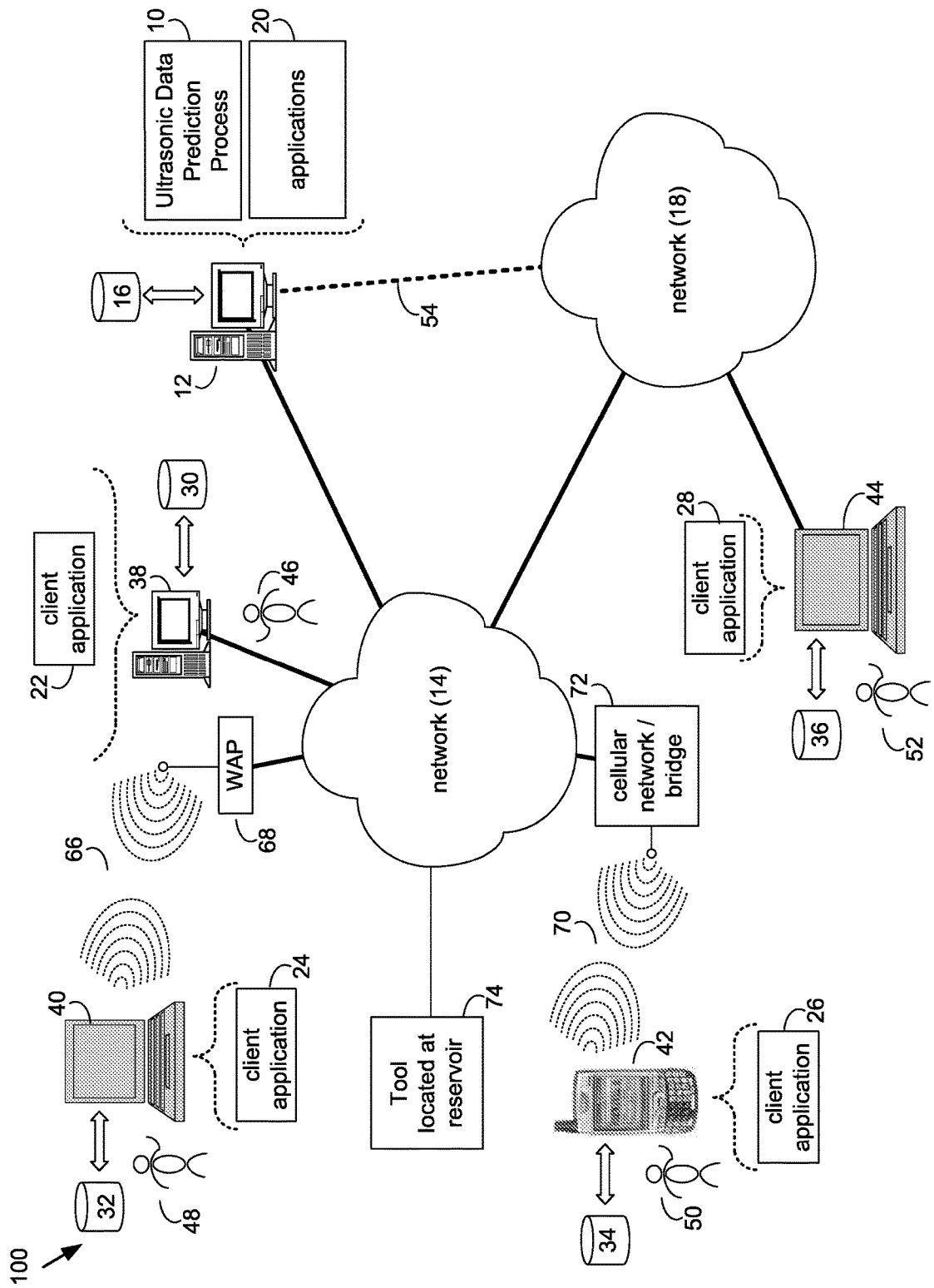
FIG. 1 illustrates a block diagram of a system for an ultrasonic data prediction process in accordance with embodiments of the present disclosure.

Referring to FIG. 1, there is shown an ultrasonic data prediction process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to:

Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, ultrasonic data prediction process 10 may reside on and be executed, in whole or in part, by a client electronic device, such as a personal computer, notebook computer, personal digital assistant, or the like.

The instruction sets and subroutines of ultrasonic data prediction process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid-state drive, a tape drive; an optical drive; a RAID array; a random access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Ultrasonic data prediction process 10 may be a standalone application or may be an applet/application/script that may interact with and/or be executed within application 20. In addition/as an alternative to being a server-side process, ultrasonic data prediction process 10 may be a client-side process (not shown) that may reside on a client electronic device (described below) and may interact with a client application (e.g., one or more of client applications 22, 24, 26, 28). Further, ultrasonic data prediction process 10 may be a hybrid server-side/client-side process that may interact with application 20 and a client application (e.g., one or more of client applications 22, 24, 26, 28). As such, ultrasonic data prediction process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access ultrasonic data prediction process 10.

Users 46, 48, 50, 52 may access ultrasonic data prediction process 10 and/or other applications associated with server computer 12 directly through the device on which the client application (e.g., client applications 22, 24, 26, 28) is executed, namely client electronic devices 38, 40, 42, 44, for example. Users 46, 48, 50, 52 may access process 10 and/or other applications directly through network 14 or through secondary network 18. Further, server computer 12 (i.e., the computer that executes these applications) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

In some embodiments, ultrasonic data prediction process 10 may generate an output that may be delivered to one or more onsite tools such as reservoir tool 74. Reservoir tool 74 may include, but is not limited to, those available from the Assignee of the present disclosure. In some embodiments, reservoir tool 74 may include one or more processors configured to receive an output from ultrasonic data prediction process 10 and alter the operations of reservoir tool 74. As will be discussed in greater detail below, reservoir tool 74 may generally include a sonic scanning tool, an ultrasonic scanning tool, and/or any combination of sonic and ultrasonic scanner tools.

Referring also to FIGS. 2-10 and as will be discussed in greater detail below, ultrasonic data prediction process 10 may exploit features on the lower frequency sonic data to evaluate the state of the annuli in multiple casing strings exploiting the greater depth of investigation of the sonic measurement. In one example, the Sonic Scanner tool designed by the Assignee of the present disclosure may transmit acoustic waves less than 20 kHz and may receive the reflected and refracted waveforms in its receiver arrays. The receiver array generally includes e.g., 13 axial stations and e.g., 8 azimuthal receivers at each station. In some embodiments of the Sonic Scanner tool, there may be two near-monopole transmitters sitting on each end of the receiver array and another far-monopole transmitter as well as two orthogonally oriented dipole transmitters locating farther down the tool. With such features, Sonic Scanner may be able to measure the well borehole with one or multiple annuli by using different wave modes. While successful in detecting changes such as top of the cement or solids, these techniques suffer from a loss of azimuthal resolution that was afforded by the ultrasonic scanning measurement.

In some embodiments, ultrasonic data prediction process 10 may restore some of the azimuthal resolution for better assurance using sonic data. As will be discussed in greater detail below, ultrasonic data prediction process 10 may utilize the probing of the outer string and annulus with the same physical condition with both inner string sonic measurements and outer string ultrasonic measurements. As will be discussed below, ultrasonic data prediction process 10 may assume a nonlinear relationship between the ultrasonic data and the sonic data. In some embodiments of the present disclosure, ultrasonic data prediction process 10 may predict a higher resolution ultrasonic map of the outer string using the sonic data collected in the inner string by establishing a nonlinear regression model based on a deep neural network (e.g., one or more neural networks). Such a deep neural network oriented for nonlinear regression may generally include convolutional and/or fully-connected neural networks and others types of neural networks for performance improvement. A collection of sonic and ultrasonic data pairs may be provided to train the model from a various of depth regions. With such a nonlinear regression model generated, ultrasonic data prediction process 10 may predict the ultrasonic data of the outer string from the sonic data of the inner string and save the efforts of removing the inner string for obtaining the actual ultrasonic measurements of the outer string.

In some embodiments, and referring also to FIG. 2, ultrasonic data prediction process 10 may generally include receiving 200, using one or more processors, sonic data associated with an inner casing of a well. Predicted ultrasonic data associated with an outer casing of the well may be generated 202 based upon, at least in part, a nonlinear regression model and the received sonic data associated with the inner casing of the well.

Figure 3:
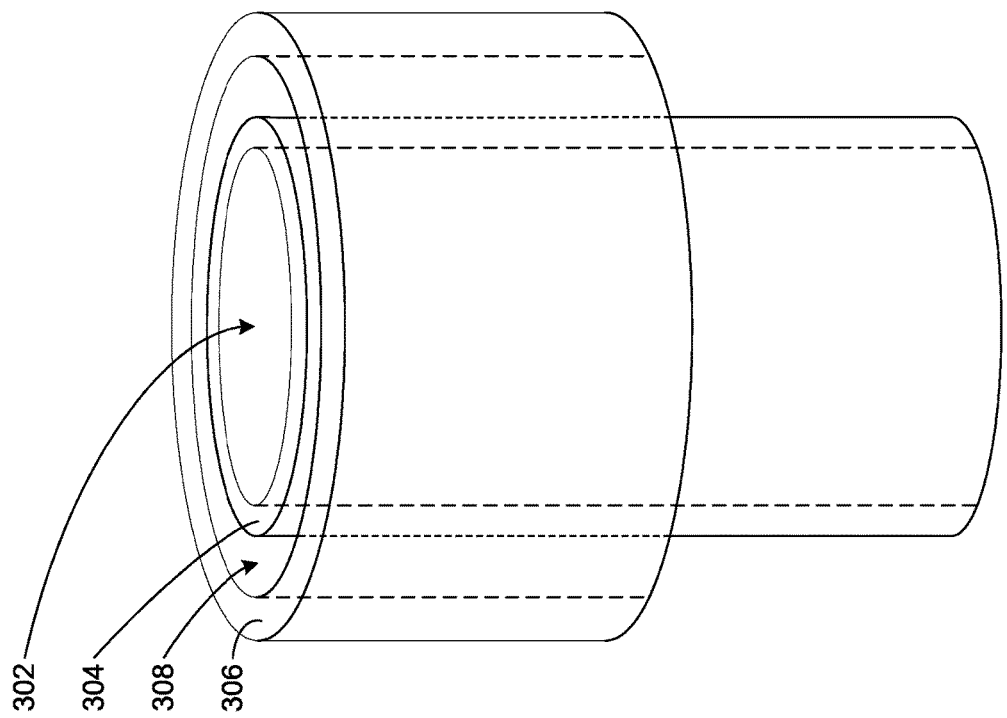
FIG. 3 illustrates an example of a well borehole consistent with embodiments of the present disclosure.

Referring also to the example of FIG. 3 and in some embodiments, ultrasonic data prediction process 10 may receive 200 sonic data associated with an inner casing of a well. As shown in the example of FIG. 3, a well (e.g., well 300) may include a borehole (e.g., borehole 302) comprising an inner casing (e.g., inner casing 304), an outer casing (e.g., outer casing 306), and an annulus between the inner casing and the outer casing (e.g., annulus 308). In some embodiments, a reservoir tool (e.g., reservoir tool 74) may be deployed into the borehole (e.g., borehole 302) to obtain measurements associated with the well. As known in the art, a casing may generally include a large diameter pipe that is assembled and inserted into a borehole. In some embodiments, the casing may generally protect and support the well. In some embodiments and as generally known in the art, an annulus may generally include any void between any piping, tubing, or casing and the piping, tubing, or casing immediately surrounding it. While FIG. 3 shows a single inner casing and a single outer casing of a well borehole, it will be appreciated that any number of casings may be used within a well borehole with any number of annuli between the casings. For example, a well may include a first annulus between a production tubing and the smallest casing string. This first annulus may provide gas lift and well kills. In some embodiments, a well may have a second and or third annuli between different casing strings. In some embodiments, these annuli may not have any connection to well bore fluids but may maintain pressure in them in order to ensure integrity of the casing strings. Accordingly, it will be appreciated that various configurations with multiple casings and multiple annuli are possible within the scope of the present disclosure.

In some embodiments, reservoir tools may generally include ultrasonic scanner tools, sonic scanner tools, and/or any combination thereof. In one example, the Isolation Scanner tool designed by the Assignee of the present disclosure may use ultrasonic techniques to evaluate the conditions of cementing and casing by transmitting an ultrasonic wave with a frequency higher than about 200 kHz and combining the classical pulse-echo technique with flexural wave propagation to calculate its attenuation between the two receivers. By measuring azimuthally at the back of the casing, Isolation Scanner may generally confirm zonal isolation, pinpoints cement channels if any, and ensures confident bonding conditions. However, the Isolation Scanner (and ultrasonic scanning tools generally) cannot diagnose the zonal isolation beyond the first casing and the annulus behind it in multiple casing string geometries because the transmitted ultrasonic energy does not penetrate beyond the second casing. For example, one generally must remove the inner string (e.g., inner casing 304) beforehand to evaluate the zonal isolation conditions of the outer string (e.g., outer casing 306), which is usually quite expensive. While an example of the Isolation Scanner tool has been described above, it will be appreciated that any ultrasonic scanning tool may be used within the scope of the present disclosure. As discussed above, ultrasonic data prediction process 10 may receive 200 sonic data associated with an inner casing of a well and, as will be discussed in greater detail, may generate predicted ultrasonic measurements associated with an outer casing and/or annuli of a well borehole using a nonlinear regression model generated using one or more neural networks based upon, at least in part, the received sonic data associated with the inner casing of the well.

For example, the Sonic Scanner tool designed by the Assignee may transmit acoustic waves less than 20 kHz and may receive the reflected and refracted waveforms in its receiver arrays. The receiver array generally includes e.g., 13 axial stations and e.g., 8 azimuthal receivers at each station. In some embodiments of the Sonic Scanner tool, there may be two near-monopole transmitters sitting on each end of the receiver array and another far-monopole transmitter as well as two orthogonally oriented dipole transmitters located farther down the tool. With such features, the Sonic Scanner tool may be able to measure the well borehole with one or multiple annuli by using different wave modes. While an example has been provided of a sonic scanning tool, it will be appreciated that any sonic scanning tool may be used within the scope of the present disclosure. In some embodiments, while successful in detecting changes such as top of the cement or solids, sonic scanning techniques generally suffer from a loss of azimuthal resolution that is afforded by an ultrasonic scanning measurement.

In some embodiments, sonic data may generally refer to a plurality of sonic waveforms generated by a sonic scanning tool. As discussed above, sonic data may generally include acoustic measurements generated by a sonic tool deployed in a well borehole (e.g., borehole 302) and configured to transmit sonic waves into the inner casing (e.g., inner casing 304), the outer casing (e.g., outer casing 306), and an annulus between the inner and outer casings (e.g., annulus 308). In some embodiments, sonic data (e.g., received sonic waveforms) may be processed (e.g., by ultrasonic data prediction process 10) to generate a plurality of band-filtered slowness-time-coherence (STC) images. For example, after the sonic waveforms are received 200, ultrasonic data prediction process 10 may normalize the received sonic waveforms to the normalization factors of their corresponding receivers in the array of the sonic scanning tool and may crop the waveforms to be shorter for expedited processing. In some embodiments, for each depth, the normalized and cropped sonic waveforms at the jth receiver of the ith axial station may be referred to as $r_{ij}(t)$ where i=1, . . . , $N_Z$, j=1, . . . , $N_\phi$, t∈[0, $N_T$] and $N_Z$ is the number of axial stations of sonic scanning tool, $N_\phi$ is the number of azimuths, and $N_T$ is the number of time samples. In some embodiments, bandpass filtering of the normalized and cropped sonic waveforms may be performed with a continuous wavelet transform (e.g., using the Morlet wavelet). For example, the Morlet wavelet may be expressed as shown in Equation 1 below:

$$w_{f_c}(t) = e^{j2\pi f_c t} e^{-\frac{t^2}{2\sigma^2}} \qquad (1)$$

where $f_c$ is the center frequency and a is a constant bandwidth.

In some embodiments, the continuous wavelet transform may be a convolution process in the time domain and, equivalently, it is simply a multiplication process in the frequency domain. In one example, the frequency spectrum of $r_{ij}(t)$ and $w_{f_0}(t)$ may be obtained as shown below in Equations 2 and 3, respectively, using the Fourier Transform:

$$R_{ij}(f) = \frac{1}{\sqrt{N_T}} \int r_{ij}(t) e^{-j2\pi f t} dt \qquad (2)$$

$$W_{f_c}(f) = \frac{1}{\sqrt{N_T}} \int w_{f_c}(t) e^{-j2\pi f t} dt \qquad (2)$$

Therefore, the bandpass filtered received signal in the frequency domain can be shown below in Equation 4:

$$R_{ij,f_c}^{(w)}(f) = R_{ij}(f) W_{f_c}(f) \qquad (4)$$

In order to include the slowness information for the STC image, Equation 5 may be introduced:

$$S_s(f) = e^{j2\pi f s} \qquad (5)$$

where s∈[$s_1$, . . . , $s_N$] belongs to a set of interested slowness values,

In some embodiments, Equation 5 may shift the bandpass filtered frequency-domain signal $R_{ij,f_c}^{(w)}(f)$ to an interested slowness s as shown in Equation 6:

$$R_{ij,f_c,s}^{(w)}(f) = R_{ij,f_c}^{(w)}(f) S_s(f) \qquad (6)$$

In some embodiments, the slowness-shifted bandpass filtered signal may be converted to the time domain with the inverse Fourier Transform as shown below in Equation 7:

$$r_{ij,f_c,s}^{(w)}(t) = \frac{1}{\sqrt{N_T}} \int R_{ij,f_c,s}^{(w)}(f) e^{j2\pi f t} df \qquad (7)$$

In some embodiments, the STC image with respect to the slowness and time for the jth azimuth and bandpass filtered at center frequency $f_c$ may be obtained by normalizing the axial domain as shown below in Equation 8:

$$STC_{j,f_c}(s, t) = (1/R_Z) \left|\sum_i r_{ij,f_c,s}^{(w)}(t)\right|^2 / \sum_i \left|r_{ij,f_c,s}^{(w)}(t)\right|^2 \qquad (8)$$

Figure 4A:
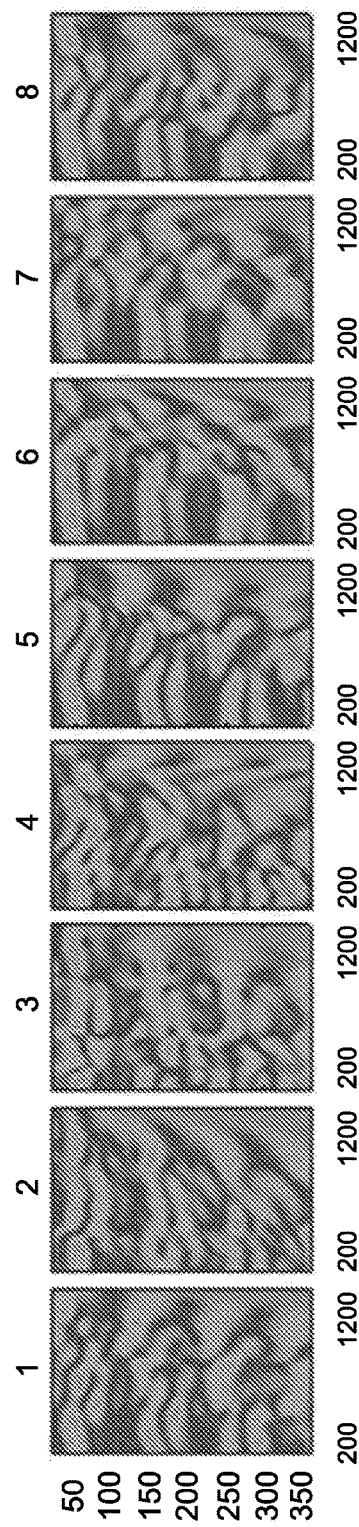
FIG. 4A illustrates a plurality of sonic waveforms or images associated with an inner casing of a well consistent with embodiments of the present disclosure.
Figure 4B:
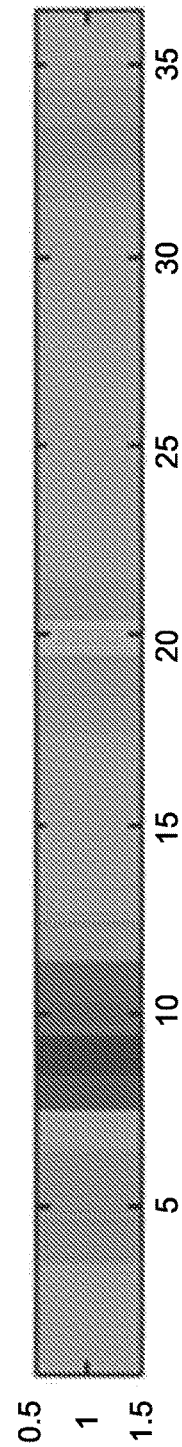
FIG. 4B illustrates a plurality of ultrasonic measurements associated with an outer casing of a well consistent with embodiments of the present disclosure.
Figure 5:
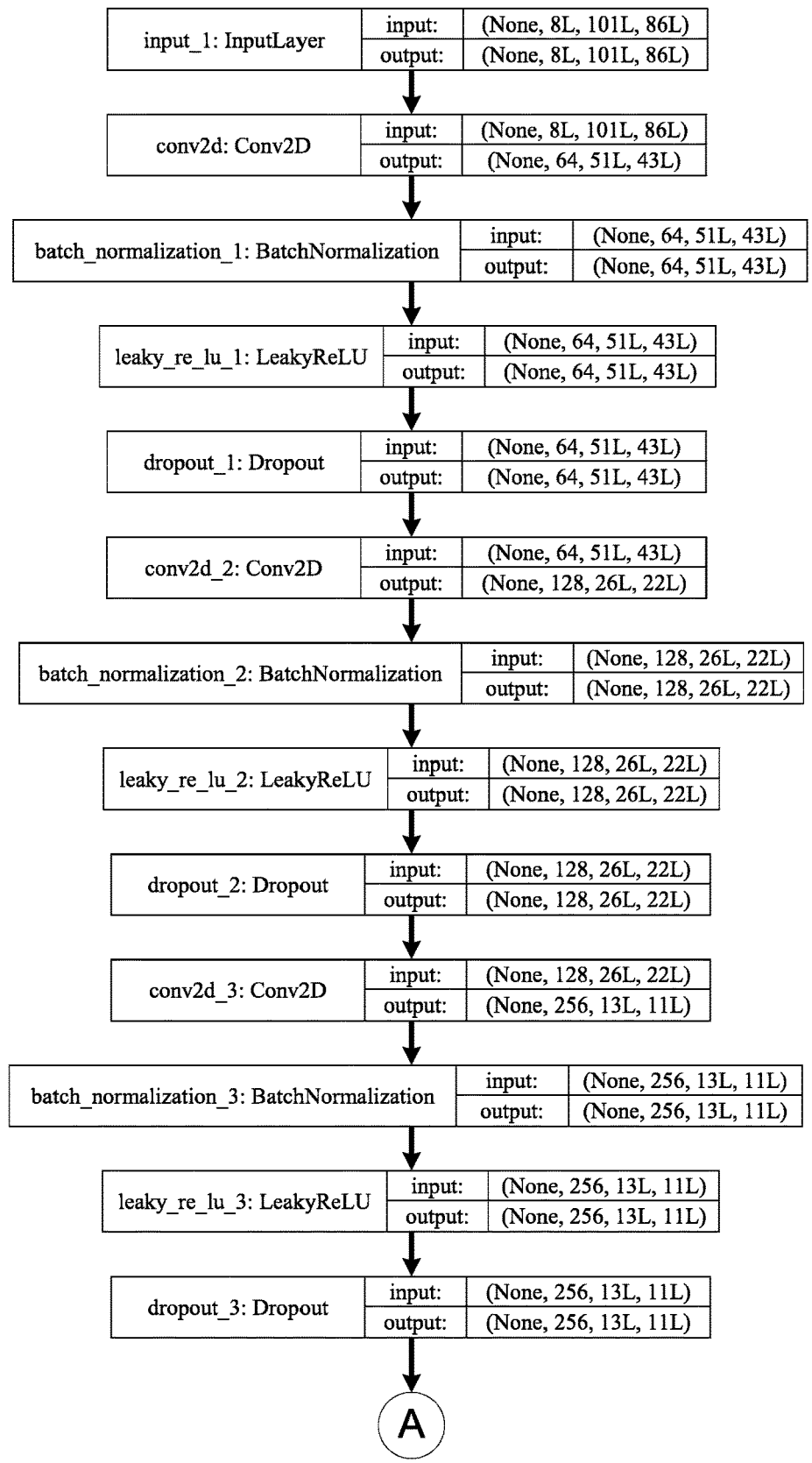
FIGS. 5-6 illustrate one or more neural networks consistent with embodiments of the present disclosure.

Referring also to the examples of FIGS. 4A-4B and in some embodiments, FIG. 4A demonstrates a plurality of processed sonic STC image examples of 8 azimuthal receivers all bandpass filtered at e.g., $f_c$=20 kHz at one single depth of the inner string. The rows of each image may refer to the slowness axis and the columns of each image may refer to the time axis. It may be observed that these STC images indicate azimuthal heterogeneity. In some embodiments and at the same depth, FIG. 4B may plot the corresponding measured ultrasonic data of the outer string. In some embodiments, ultrasonic data may generally refer to maps or azimuthal maps such as the ultrasonic flexural attenuation (UFAK) measurements. However, other ultrasonic data representations or maps that can be possibly obtained from the ultrasonic or high frequency sonic cement evaluation tools could be used either as alternatives or in conjunction with the UFAK measurements, including but not limited to acoustic impedance (AIBK) or CBL. Accordingly, both the sonic STC images and UFAK, AIBK, and CBL measurements may reflect the cementing properties of the outer string and indicate some azimuthal heterogeneity.

In some embodiments, ultrasonic data prediction process 10 may generate 202 predicted ultrasonic data associated with an outer casing of the well based upon, at least in part, a nonlinear regression model and the received sonic data associated with the inner casing of the well. As will be discussed in greater detail below, a nonlinear regression model may generally include an algorithmic model in which observational data is modeled by a function which is a nonlinear combination of model parameters and may depend on one or more independent variables. In some embodiments, data input to a nonlinear regression model may be fitted by a method of successive approximations. A neural network may generally include a plurality of highly interconnected processing elements working in parallel to solve a specific problem. In some embodiments and as known in the art, a neural network can learn by example (e.g., by being trained with labeled data). Accordingly, while the term "neural network" is used throughout the present disclosure, it will be appreciated that any machine learning, or artificial intelligence engine or model may be used within the scope of the present disclosure.

In some embodiments, ultrasonic data prediction process 10 may generate 204 the nonlinear regression model using one or more neural networks. Referring also to the example of FIGS. 5-6 and in some embodiments, one or more neural networks may include multiple layers and may accept the processed azimuthal band-filtered STC images of the sonic waveforms as the input. Referring also to the example of FIG. 5, a neural network (e.g., neural network 500) may accept the input sonic STC images to the Input Layer. In some embodiments, such input data may be organized as a fourth-order tensor, which is a set of third-order tensors. For example, each third-order tensor may be an azimuthal set of sonic STC images of dimension ($N_{\phi,f} \times N_T \times N_S$), where $N_{\phi,f}$ is the number of azimuths times the number of frequency channels, $N_T$ is the number of time samples, and $N_S$ is the number of the interested slowness values. The first-dimension size of the input tensor is $N_D$, which may be the total number of training depths. In the following layers, each third-order tensor may be processed independently. In some embodiments, the neural network parameters may be updated in batches (e.g., with the stochastic gradient descent method where the batch size is much smaller than $N_D$). However, it will be appreciated that the neural network parameters may be updated in different configurations (e.g., not in batches or different batch sizes) within the scope of the present disclosure.

In some embodiments and in response to receiving the input tensor, three series of convolutional neural network (CNN) modules of the one or more neural networks may process the input tensor. While an example of three CNN modules will be described, other numbers of CNN modules may be used within the scope of the present disclosure. In some embodiments, each CNN module may generally include four parts: a two-dimension convolution layer (Conv2D), a batch normalization layer, an activation function layer, and a dropout layer. Referring also to the example of FIG. 7 and in some embodiments, a Conv2D layer may process and input image (e.g., of size 1×5×5) to the output image (e.g., of size 1×2×3) by using a convolutional kernel (e.g., of size 1×2×2 with a stride equal to two and right padding equal to one) by a linear combination of the universal kernel properties and the pixel values of the image in different places. In some embodiments, by setting a hyperparameter stride to equal two, the image may be subsampled to become smaller and no pooling layer may be required. In some embodiments, ultrasonic data prediction process 10 may set up a reasonable number of kernels for each Conv2D layers (e.g., from 64, 128, 256, to 512), so that the layers are able to capture the intrinsic features of the sonic STC images from low to high visualization levels.

In some embodiments, the batch normalization layer may be used to normalize the previous output by subtracting the mean and dividing the standard deviation of each processing batch of data. The batch normalization layer may be used to regularize the internal data distribution and avoid overfitting, ultimately yielding stable output results. In some embodiments, a leaky rectified linear unit (LeakyReLU) may be used as an activation function layer which may have the form as shown in Equation 9 below:

$$\text{LeakyReLU}(x) = \max(x, \alpha x) \text{ with } \alpha \in (0,1). \quad (9)$$

In some embodiments, the dropout layer may randomly mute a proportion of the network neurons and also may make the one or more neural networks less prone to overfitting.

Figure 6:
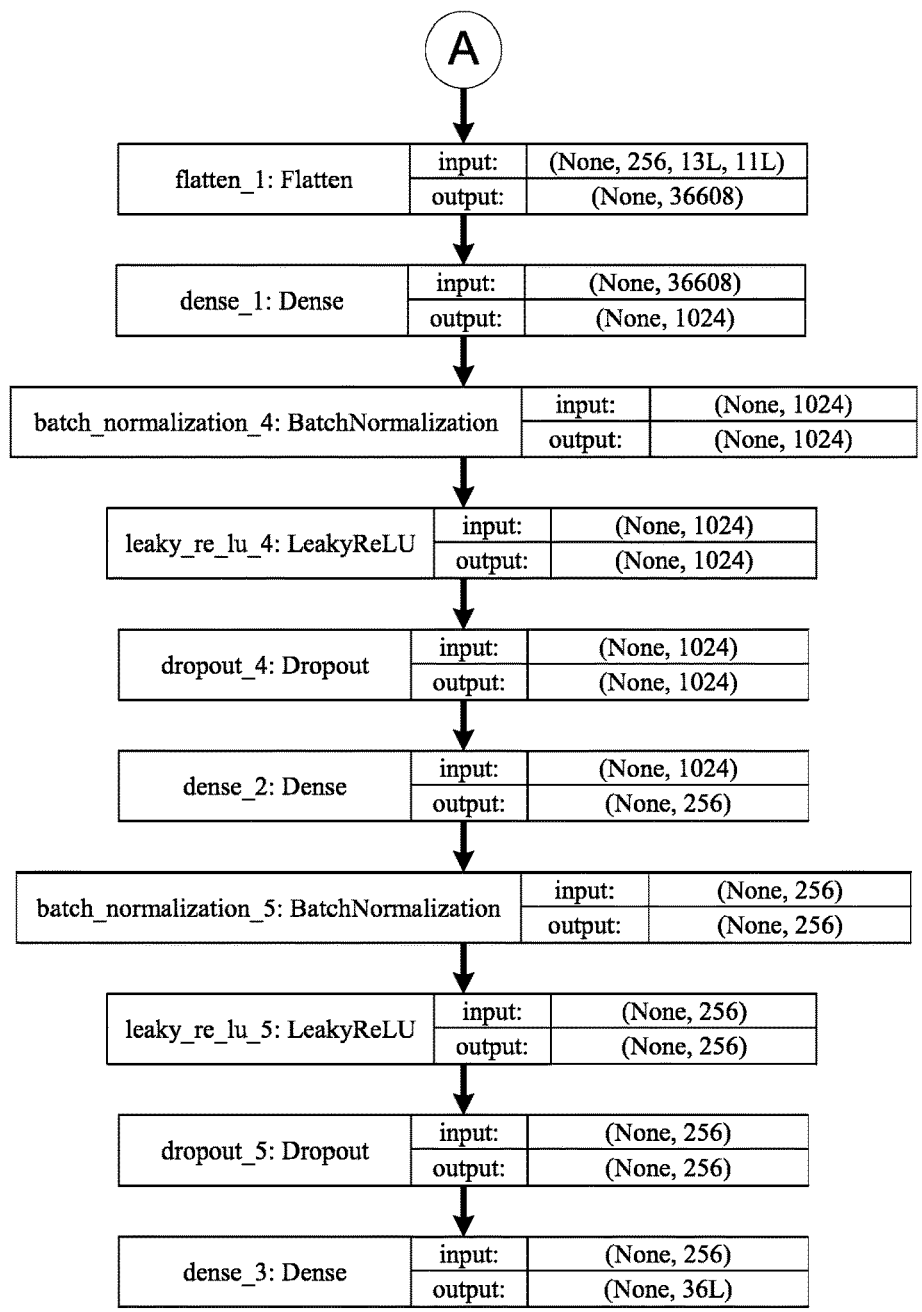
Figure 7:
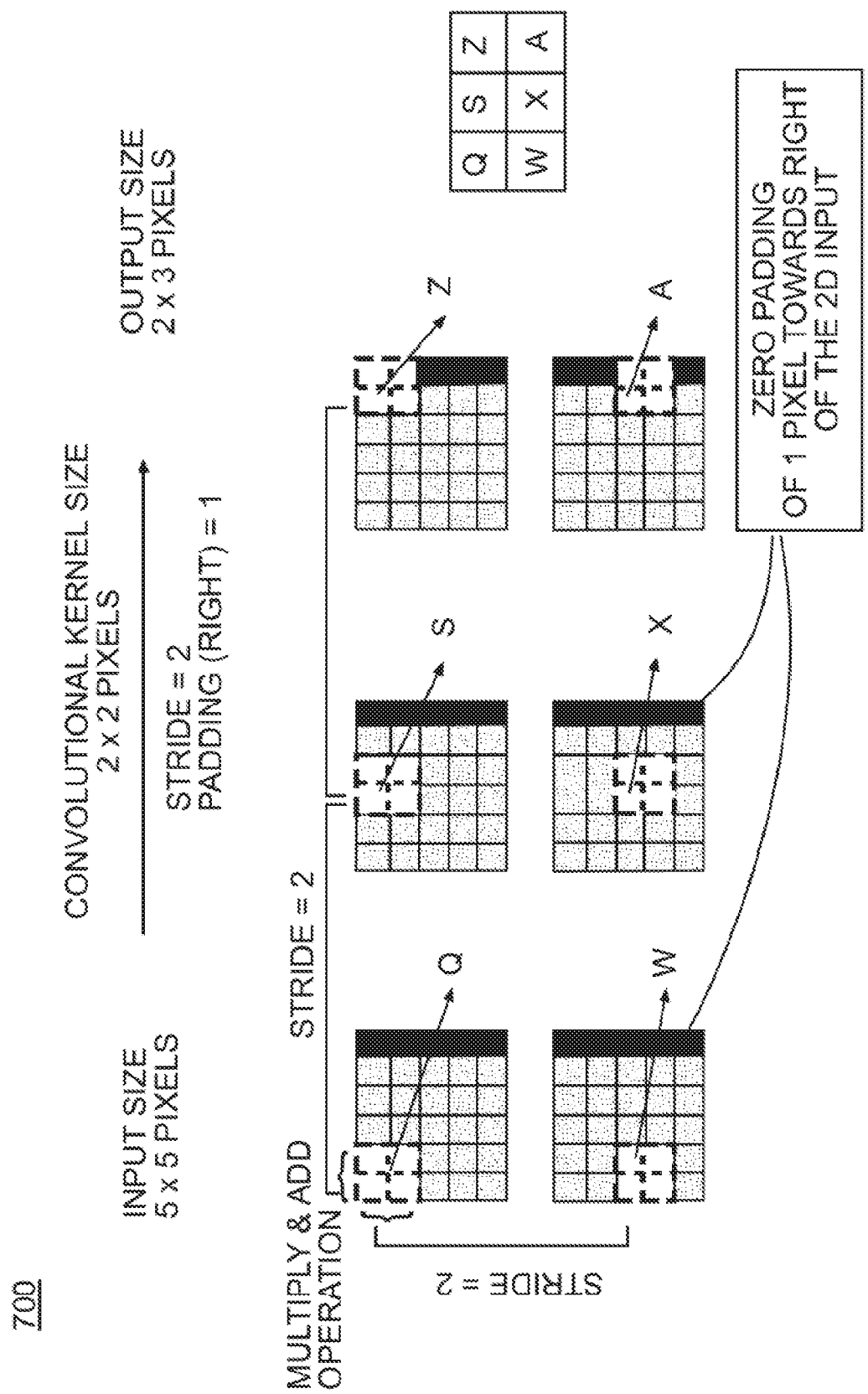
FIG. 7 illustrates an example of a convolutional layer of a neural network consistent with embodiments of the present disclosure.

Referring again to the example of FIG. 6 and in some embodiments, after a third series of the CNN modules, each output third-order tensor may be flattened to be a vector and then fed to three series of fully-connected neural networks (FC) modules for the final output of the regression results. While three FC neural network modules have been described, it will be appreciated that other numbers of FC neural network modules are possible within the scope of the present disclosure. In some embodiments and similar to the CNN module, each FC module may include a fully-connected layer, a batch normalization layer, an activation function layer, and a dropout layer, except for the last FC module which may provide a fully-connected layer providing the final output. The number of the output neurons (e.g., $N_{UFAK}$) of the one or more neural networks may be the same length of the ultrasonic (e.g. UFAK) measurement that corresponds to the input azimuthal range of the sonic STC images. In this manner, the one or more neural networks may generate 204 a nonlinear regression model for predicting ultrasonic measurements using received sonic data.

In some embodiments, the probabilistic Conv2D and fully-connected (FC) layers may be placed to convert the original above said point-estimate neural network to be Bayesian neural network. By such means, the parameters of the neural networks are no longer fixed but a posterior probability distribution given the input data so one can feed in the same input given the trained model based on Bayesian neural network for many times and get multiple different predicted outputs (on the contrary, given the trained above said point-estimate neural network, one always gets the same predicted outputs if one feeds in the same data for multiple times), so that the uncertainty (a.k.a., confidence) of the predicted ultrasonic data at given depths can be measured.

In some embodiments and as will be discussed in greater detail below, ultrasonic data prediction process 10 may train the one or more neural networks with a plurality of sonic data and ultrasonic data pairs defined for a plurality of well depths. For example, ultrasonic data prediction process 10 may receive 206 measured ultrasonic data associated with the outer casing of the well at a plurality of well depths. As discussed above, an ultrasonic scanning tool may be used to transmit an ultrasonic wave into the casing and combine the classical pulse-echo technique with flexural wave propagation to calculate its attenuation between the two receivers. By measuring azimuthally at the back of the casing, the ultrasonic scanning tool may generally confirm zonal isolation, pinpoints cement channels if any, and ensures confident bonding conditions.

In some embodiments, ultrasonic data prediction process 10 may identify 208 corresponding sonic data at the plurality of well depths from the received sonic data associated with the inner casing of the well, thus defining a plurality of sonic data and ultrasonic data pairs defined for the plurality of well depths. For example, to verify the regression model on the field data, a pair of sonic data (e.g., sonic STC images) of the inner string and ultrasonic data (e.g., UFAK measurements) of the outer string at the same depth regions in the well may be determined. The relative bearing of an ultrasonic scanning tool may be compensated to that of a sonic scanning tool so that the data from both tools are aligned in azimuthal direction.

In some embodiments, ultrasonic data prediction process 10 may estimate 210 an inner casing standoff from the outer casing of the well based upon, at least in part, the measured ultrasonic data. The inner casing standoff is the distance between the inner casing and the outer casing. For example, ultrasonic data prediction process 10 may use ultrasonic third interface data from the inner string to include the azimuthal standoff of the two strings.

In some embodiments, ultrasonic data prediction process 10 may train 212 the one or more neural networks with the plurality of sonic data and ultrasonic data pairs defined for the plurality of well depths. For example, ultrasonic data prediction process 10 may randomly select e.g., 15% data from a training set as a validation set that does not join the training process to monitor if the model becomes overfitted and provide the rest of the training set (e.g., the plurality of sonic data and ultrasonic data pairs defined for the plurality of well depths) to the input of the one or more neural networks. To further reduce the possibility of getting the model overfitted besides the above-mentioned advanced techniques of deep learning, ultrasonic data prediction process 10 may use real-time data augmentation techniques to expand of the training set. In a non-limiting example, real-time data augmentation may include training a nonlinear regression model with a subset of azimuths of data pairs, aligning these subsets of azimuths, rotating the subsets of azimuths in an overlapping manner and regarding them as a new subset of azimuths, (e.g., sonic data from sonic azimuths (0, 1, 2), sonic azimuths (1, 2, 3), sonic azimuths (2, 3, 4), etc., along with their corresponding ultrasonic data from ultrasonic azimuths, are regarded as independent training data), and hence the total number of sonic/ultrasonic data pairs for training is increased. In one example, a practical training process of the regression model may include e.g., 20 epochs and e.g., 500 batches of training data per epoch. Each batch of training data may include e.g., 64 pairs of sonic STC images and UFAK measurements. However, it will be appreciated that other numbers of epochs and batches may be used for training 212 the one or more neural networks with the plurality of sonic data and ultrasonic data pairs defined for the plurality of well depths within the scope of the present disclosure. For example, and in some embodiments, different subsets of the azimuthal sonic data (such as covering a quadrant, a semicircle, all azimuths, etc.) may be used as training input for predicting the ultrasonic data (e.g., ultrasonic map of the outer casing). Any subset of sonic azimuths, ranging from one sonic azimuth (45 degrees) to all sonic azimuths (360 degrees) are possible.

Figure 8:
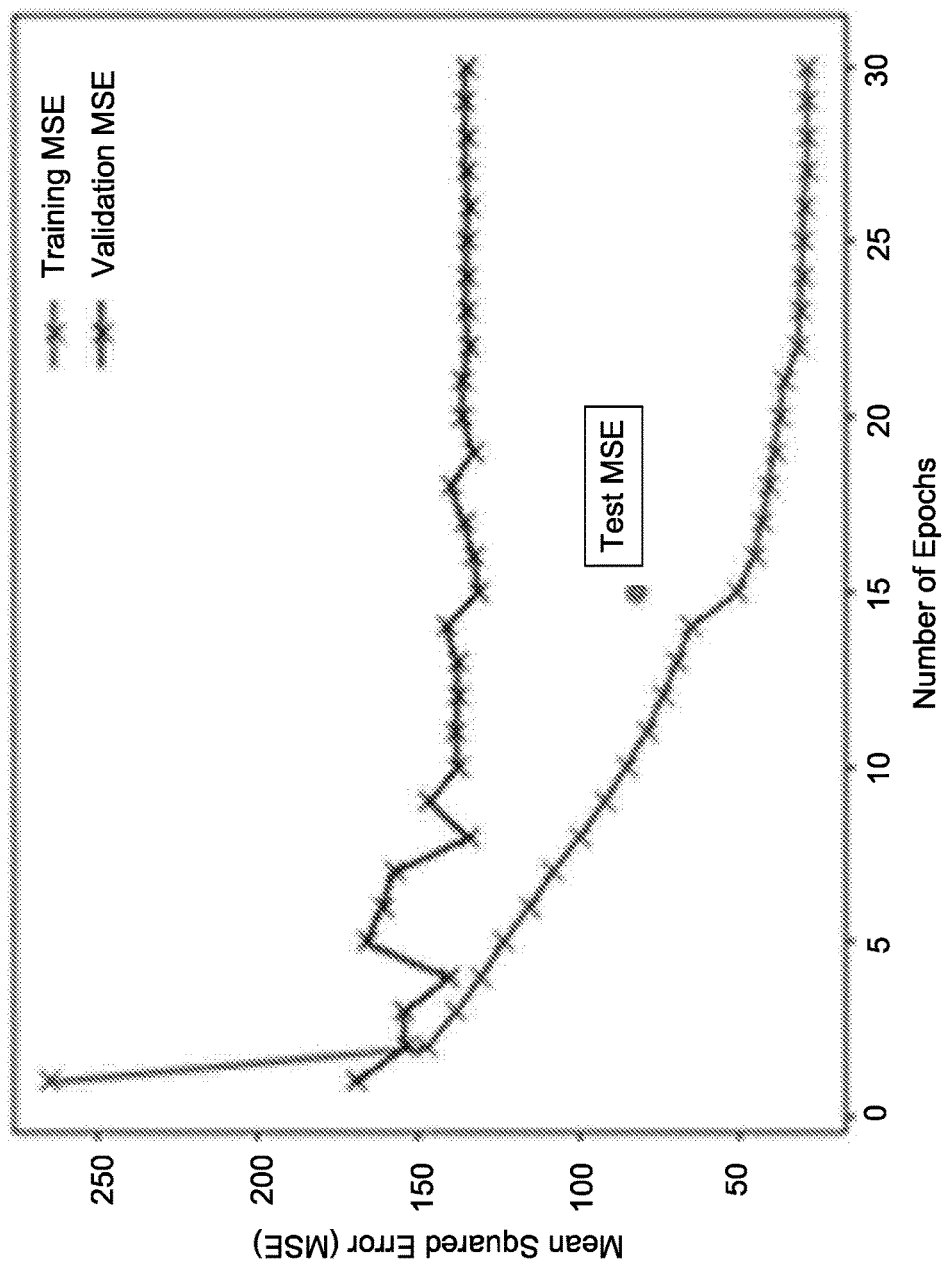
FIGS. 8-9 illustrate mean squared error and mean absolute error over a number of epochs as an error metric function of the training of the one or more neural networks with sonic data and ultrasonic data pairs consistent with embodiments of the present disclosure.
Figure 9:
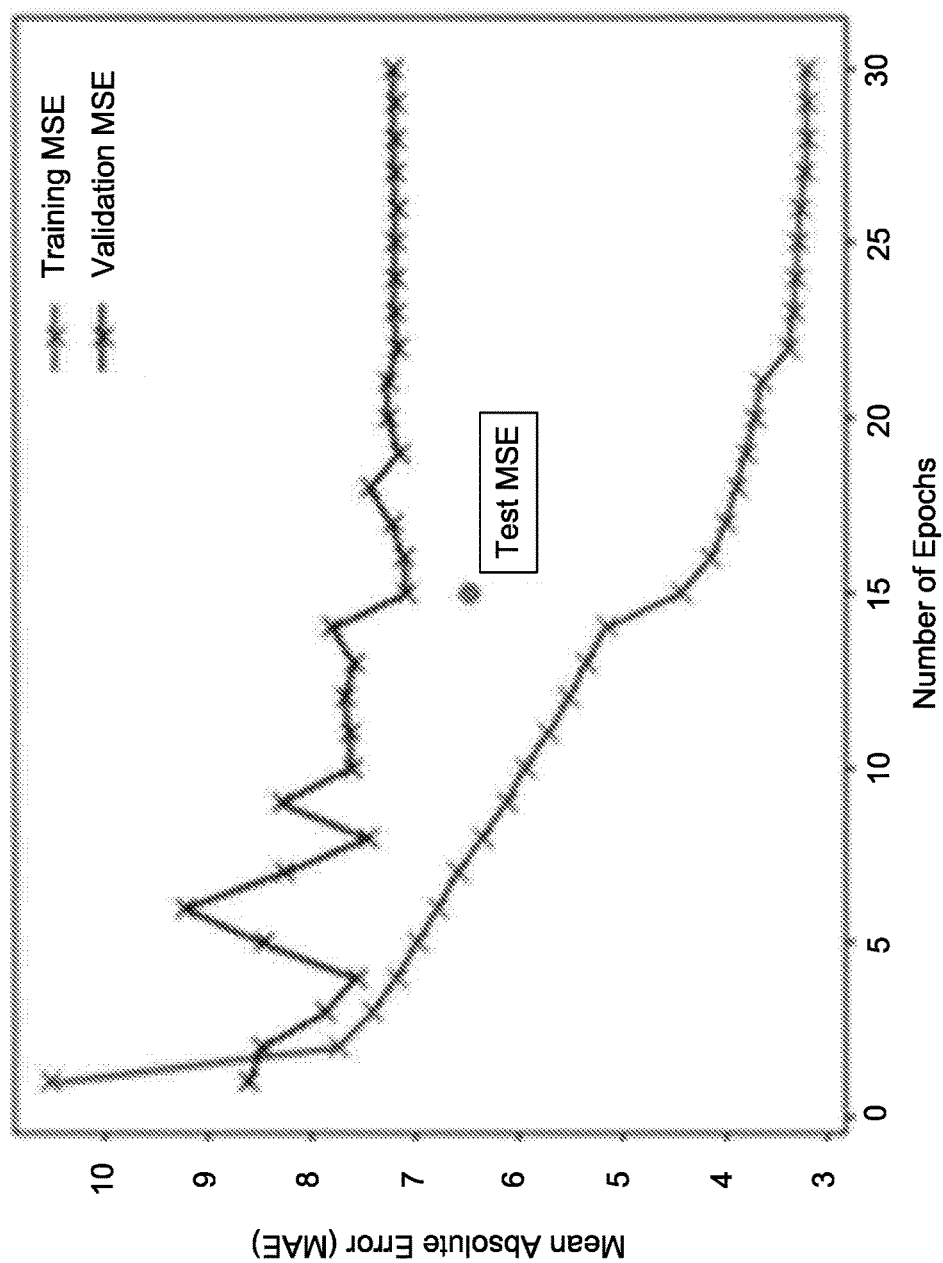

Referring also to FIGS. 8-9 and in some embodiments, mean squared error and/or mean absolute error can be used as the error metric function of the training. For example, and in some embodiments, a plurality of sonic STC images of the inner string may be input to the trained model and the error may be computed for the regression results with that of the true mapping (e.g., sonic data and ultrasonic data pair). The resulting test error is plotted as mean squared error versus the number of epochs during the training process as shown in FIG. 8 and the mean absolute error versus the number of epochs during the training process as shown in FIG. 9 and compares favorably with the training and validation errors, indicating the success of this approach. As can be seen from FIGS. 8-9, both error metrics reduce dramatically, and no evident overfitting is observed from the validation error metrics.

In some embodiments, ultrasonic data prediction process 10 may calibrate 214 the trained one or more neural networks for generating predicted ultrasonic data on one or more of a different well and a different well depth, via transfer learning. For example, this approach may involve a number of wells to train the nonlinear regression model using the pair of sonic and ultrasonic data in both casings. In some embodiments, a trained nonlinear regression model (e.g., trained neural networks used to generate the nonlinear regression model) may be applied to new wells on the sonic data in the inner string to predict the azimuthal variation in an annulus typically picked up by the ultrasonic evaluation of the outer string. In this manner, the generation of predicted ultrasonic data may be transferred from a first well or set of wells that are used to train the nonlinear regression model to another well or set of wells. In some embodiments, calibrating 214 the trained one or more neural networks for generating the nonlinear regression model may include using a known free pipe section on the outer string to calibrate the model using transfer learning. In this manner, known outer casing data may help calibrate 214 the nonlinear regression model for other wells.

Figure 10:
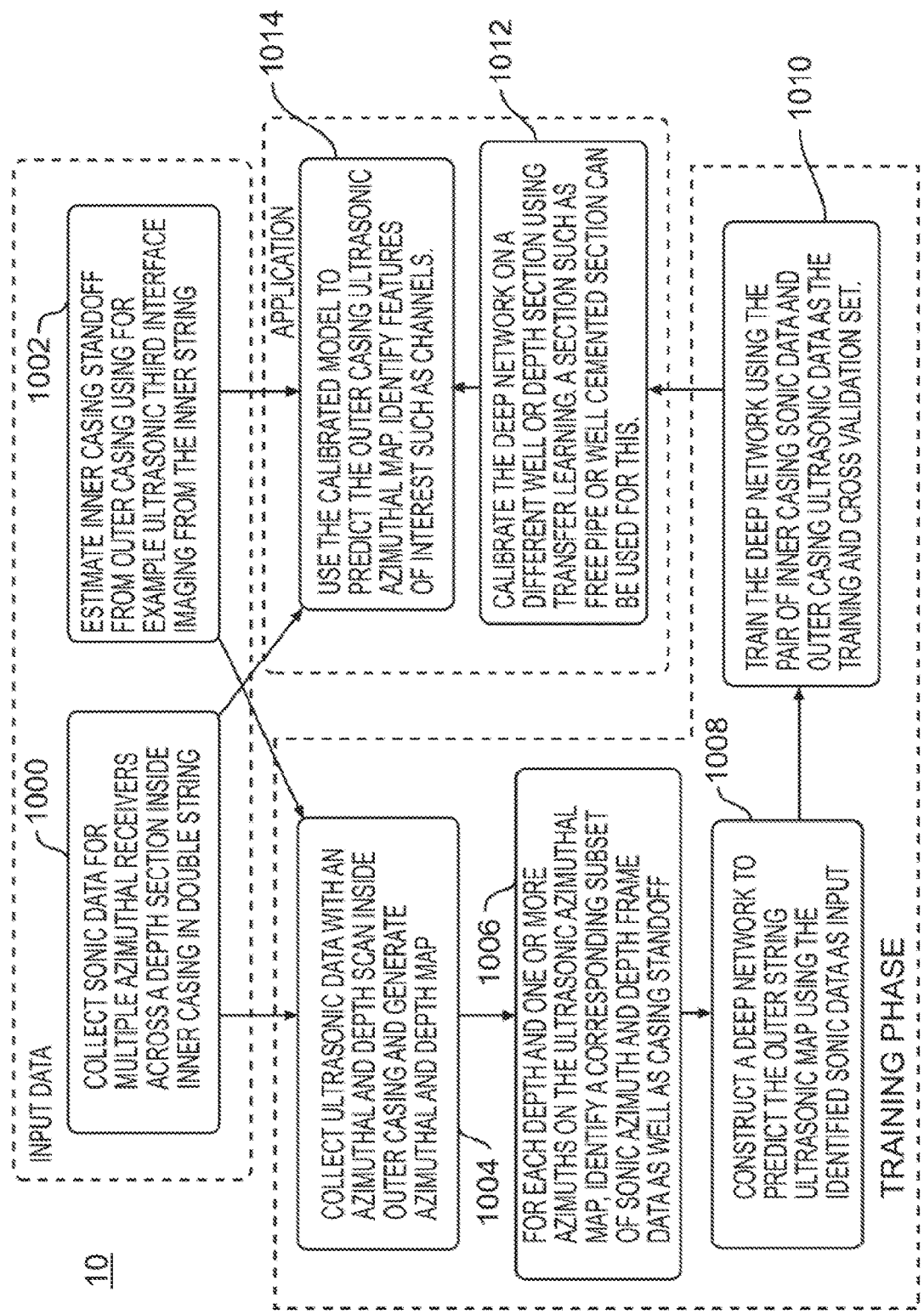
FIG. 10 illustrates a flowchart showing operations consistent with embodiments of the present disclosure.

Referring also to FIG. 10 and in some embodiments, ultrasonic data prediction process 10 may collect or receive 1000 sonic data for multiple azimuthal receivers across a depth section inside an inner casing of a double string well (e.g., multiple strings). In some embodiments, ultrasonic data prediction process 10 may estimate 1002 an inner casing standoff from the outer casing using, for example, ultrasonic third interface imaging from the inner string (e.g., inner casing). As discussed above, ultrasonic data prediction process 10 may generate the nonlinear regression model using one or more neural networks. For example, ultrasonic data prediction process 10 may collect 1004 ultrasonic data with an azimuthal and depth scan inside an outer casing and generate an azimuthal and depth map (e.g., ultrasonic measurements). Ultrasonic data prediction process 10 may, for each depth and one or more azimuths on the ultrasonic azimuthal map, identify 1006 a corresponding subset of sonic azimuth and depth frame data. In some embodiments, ultrasonic data prediction process 10 may also identify a corresponding casing standoff. Ultrasonic data prediction process 10 may construct or generate 1008 one or more neural networks to predict outer string ultrasonic map using the identified sonic data as input. In some embodiments, ultrasonic data prediction process 10 may train 1010 the one or more neural networks using the pair of inner casing sonic data and outer casing ultrasonic data as the training and/or validation set. Ultrasonic data prediction process 10 may calibrate 1012 the one or more neural networks on a different well or a different depth section of the same well using transfer learning. In some embodiments, ultrasonic data prediction process 10 may use 1014 the calibrated model to predict the outer casing ultrasonic azimuthal map (e.g., ultrasonic data associated with the outer casing). In some embodiments, ultrasonic data prediction process 10 may identify features of interest in the predicted ultrasonic azimuthal map (e.g., channels, etc.).

The flowcharts and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for predicting ultrasonic data associated with a well, the method comprising:
receiving, using one or more processors, sonic data associated with an inner casing of the well; and
generating predicted ultrasonic data associated with an outer casing of the well based upon, at least in part, a nonlinear regression model and the received sonic data associated with the inner casing of the well, wherein the nonlinear regression model is generated using one or more neural networks, wherein generating the nonlinear regression model using the one or more neural networks comprises: receiving measured ultrasonic data associated with the outer casing of the well at a plurality of well depths; identifying corresponding sonic data at the plurality of well depths from the received sonic data associated with the inner casing of the well, thus defining a plurality of sonic data and ultrasonic data pairs defined for the plurality of well depths, and training the one or more neural networks with the plurality of sonic data and ultrasonic data pairs defined for the plurality of well depths.

2. The computer-implemented method of claim 1, wherein generating the nonlinear regression model using the one or more neural networks includes:
calibrating the trained one or more neural networks for generating predicted ultrasonic data on one or more of a different well and a different well depth, via transfer learning.

3. The computer-implemented method of claim 1, further comprising:
estimating an inner casing standoff from the outer casing of the well based upon, at least in part, the measured ultrasonic data.

4. The computer-implemented method of claim 1, wherein the one or more neural networks include at least one of:
one or more convolutional neural networks; and
one or more fully-connected neural networks.

5. The computer-implemented method of claim 1, wherein the received sonic data includes a plurality of sonic waveforms generated via a sonic scanning tool.

6. The computer-implemented method of claim 1, wherein the predicted ultrasonic data is selected from a group consisting of: a plurality of ultrasonic flexural attenuation (UFAK) measurements, acoustic impedance (AIBK), and high frequency sonic cement bond logging (CBL).

7. A computing system including one or more processors and one or more memories configured to perform operations comprising:
receiving sonic data associated with an inner casing of the well; and
generating predicted ultrasonic data associated with an outer casing of the well based upon, at least in part, a nonlinear regression model and the received sonic data associated with the inner casing of the well, wherein the computing system is configured to generate the nonlinear regression model using one or more neural networks by: receiving measured ultrasonic data associated with the outer casing of the well at a plurality of well depths, identifying corresponding sonic data at the plurality of well depths from the received sonic data associated with the inner casing of the well, thus defining a plurality of sonic data and ultrasonic data pairs defined for the plurality of well depths, and training the one or more neural networks with the plurality of sonic data and ultrasonic data pairs defined for the plurality of well depths.

8. The computing system of claim 7, wherein generating the nonlinear regression model using the one or more neural networks includes:
calibrating the trained one or more neural networks for generating predicted ultrasonic data on one or more of a different well and a different well depth, via transfer learning.

9. The computing system of claim 7, further configured to perform operations comprising:
estimating an inner casing standoff from the outer casing of the well based upon, at least in part, the measured ultrasonic data.

10. The computing system of claim 7, wherein the one or more neural networks include at least one of:

one or more convolutional neural networks; and
one or more fully-connected neural networks.

11. The computing system of claim 7, wherein the received sonic data includes a plurality of sonic waveforms generated via a sonic scanning tool.

12. The computing system of claim 7, wherein the predicted ultrasonic data includes but are not limited to a plurality of ultrasonic flexural attenuation (UFAK) measurements, acoustic impedance (AIBK) measurements, and high frequency sonic cement bond logging (CBL) measurements.

* * * * *